(12) United States Patent
Gibb et al.

(10) Patent No.: US 9,458,701 B2
(45) Date of Patent: Oct. 4, 2016

(54) VOCAL DRILLING ALARM NOTIFICATION

(71) Applicant: CONOCOPHILLIPS COMPANY, Houston, TX (US)

(72) Inventors: John Gibb, Houston, TX (US); Son Van Pham, Houston, TX (US); Raul Eloy Lema, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 64 days.

(21) Appl. No.: 14/621,710

(22) Filed: Feb. 13, 2015

(65) Prior Publication Data

US 2015/0226038 A1 Aug. 13, 2015

Related U.S. Application Data

(60) Provisional application No. 61/939,463, filed on Feb. 13, 2014.

(51) Int. Cl.
G10L 13/08 (2013.01)
E21B 41/00 (2006.01)
G10L 13/00 (2006.01)
G10L 15/26 (2006.01)

(52) U.S. Cl.
CPC .......... *E21B 41/0021* (2013.01); *G10L 13/00* (2013.01); *G10L 15/26* (2013.01)

(58) Field of Classification Search
CPC .... G01V 11/005; G01V 11/00; G01V 1/284; G01V 2210/6222; G01V 2210/66
USPC ............. 704/260; 166/250.15, 337; 700/282; 340/309.7, 679; 361/29; 702/13
See application file for complete search history.

(56) References Cited

U.S. PATENT DOCUMENTS

| | | | | |
|---|---|---|---|---|
| 5,189,388 A * | 2/1993 | Mosley | ............... | E21B 41/0021 340/309.7 |
| 8,594,938 B2 * | 11/2013 | Guglielmo | ........... | G05B 19/042 702/13 |
| 8,752,621 B2 * | 6/2014 | Carlson | ................. | E21B 43/127 166/250.15 |
| 2014/0110124 A1 * | 4/2014 | Goldner | .............. | E21B 47/1025 166/337 |

* cited by examiner

*Primary Examiner* — Charlotte M Baker
(74) *Attorney, Agent, or Firm* — Boulware & Valoir

(57) ABSTRACT

A system, method and apparatus for speech based control of an oil well control system.

16 Claims, 3 Drawing Sheets

VOCAL DRILLING ALARM NOTIFICATION

PRIORITY CLAIM

This application is a non-provisional application which claims benefit under 35 USC §119(e) to U.S. Provisional Application Ser. No. 61/939,463 filed Feb. 13, 2014, entitled "VOCAL DRILLING ALARM NOTIFICATION," which is incorporated herein in its entirety.

FIELD OF THE INVENTION

This disclosure relates to an apparatus, systems and methods for oilwell drilling alarm notification in the event a dangerous situation or hazard is about to be encountered. The use of vocal or speech-based prompts will free the operator from needing to monitor a visual display and voice prompts of appropriate responses to the hazard has the potential to greatly speed response time.

BACKGROUND OF THE INVENTION

Oil well control is one of the most important aspects of drilling operations. Improper handling of kicks in oil well control can result in blowouts with very grave consequences, including the loss of valuable resources. Even though the cost of a blowout (as a result of improper/no oil well control) can easily reach several millions of US dollars, the monetary loss is not as serious as the other damages that can occur: irreparable damage to the environment, waste of valuable resources, ruined equipment, and most importantly, the safety and lives of personnel on the drilling rig.

In addition to containing kicks and preventing blowouts oil well control procedures can cover a variety of other downhole conditions. For example, drillbit speed, torque and direction must be controlled during drilling, as well as the weight on bit (WOB). The flow of drilling mud and the density of the mud are also controlled, so that when WOB and cutting removal by the drilling mud are optimized and the rate-of-penetration (ROP) by the drillbit may also be optimized.

A number of downhole devices placed in close proximity to the drill bit measure certain downhole parameters associated with the drilling and downhole conditions. Such devices typically include sensors for measuring downhole temperatures and pressures, azimuth and inclination measuring devices, and a resistivity-measuring device to determine the presence of hydrocarbons and water.

As the drilling bit travels down through the formation, the geology will change and additional downhole instruments, known as logging-while-drilling ("LWD") and/or measurement-while drilling ("MWD") tools, are frequently attached to the drillstring to determine the formation geology and formation fluid conditions during the drilling operations.

As the downhole operating conditions change and the operator must react to such changes and adjust the surface-controlled parameters to optimize the drilling operations. Usually, the drilling operator monitors the downhole conditions via the various sensor readings on as display, attempts to identify the occurrence of undesirable downhole conditions, and then takes action at the surface by adjusting one or more of the surface-controlled drilling parameters, to mitigate the undesirable condition.

Accordingly, this conventional approach seeks to manually address the downhole issues as or after they arise. In some cases, by the time the drilling operator has recognized the downhole problem and altered the surface-controlled drilling parameters, expensive damage to the drillstring, the drill bit, and/or other downhole components has already occurred.

Some drilling operations employ predictive models that receive data relating to surface and/or downhole conditions and output a set of recommended values for the drilling parameters (e.g., bit RPM) based on analysis of such measurements. The recommended drilling parameters may be implemented manually or via automated control systems. However, the physics behind such modeling schemes is complex, and typically depend on accurate measurements of surface and downhole conditions, which are often difficult to obtain in the harsh drilling environment. Consequently, some of the predictive models are less effective than desired.

Software has been designed to monitor and report the various conditions that need to be monitored and adjusted to during the various drilling and oil recovery operations. US20120217067, for example describes a software program that collects data and based on a comparison of the measured data with the well plan models, and a comparison of the measured data with the minimum and maximum values for each drilling parameter, the processor determines if any adjustments are necessary to maintain the current well plan, and displays status and warning information via displays. Similar software-based oilwell control systems are disclosed in U.S. Pat. No. 8,332,153, U.S. Pat. No. 7,729,895, U.S. Pat. No. 6,820,702, US20120123756, US20120139747, US20100193245, and the like.

However, most of these programs only require a warning signal to be visually displayed, thus requiring the operator to continuously monitor the display, although for dangerous indicators, like a kick, the software may implement an automated response such as immediate shut in and adding the required kill weight of mud to kill the flow.

Even if an audible warning signal is incorporated into the software, such alarms provide no information about the quality of the hazard, nor which remedial action(s) would be appropriate. Thus, valuable time can be lost as the operator ascertains the nature of the hazard and the appropriate reaction.

Thus, what is needed in the art are better methods of monitoring well drilling completion and production conditions, and in particular better methods of warning operators about potential hazards and provides the appropriate remedial steps. This disclosure addresses one or more of those needs.

SUMMARY OF THE INVENTION

The disclosure relates to software for monitoring downhole conditions during drilling, completion, steam injection, scale inhibitor squeezes, shut-in, drawback, production and other oil & gas exploration, production, workover and post production stages. The difference with the disclosed method is that the software is provided with a set of verbal warnings and remedial actions that are speech-based instead of merely providing a visual display or audible warning tone. Therefore, the operator has more freedom and is not tied to a visual display system. Further, since the warnings are speech-based, rather than being a uniform warning tone for all hazards, the operator is immediately provided with critical information when the system detects a hazard. Finally, the system can also provide a verbal description of one or more appropriate responses so that the time between warning and action is even further reduced. The concept is particularly useful in the complex environment of a drilling rig and wellpad and associated equipment and sensor, which is a dangerous environment, filled with large equipment and which involves hazardous, and in many cases explosive, chemicals.

Generally speaking, the invention is an automated system for controlling operations within an oil and gas wellbore, said system comprising: a processor at or near a wellpad, said processor operably connected to a speaker; a wellbore at said wellpad, said wellbore equipped with a plurality of sensors; said sensors operably connected to provide sensor inputs to said processor; said processor analyzing data from said sensor inputs and predicting when a hazard is about to occur; said speaker providing a speech based warning when said hazard is predicted.

Preferably the processor also predicts one or more suitable responses to said hazard and said speaker provides one or more speech based instructions when said one or more responses are predicted.

Alternatively the invention is directed to an oilwell control system comprising a processor operably connected to a speaker and operably connectable to a plurality of sensor inputs, said processor analyzing data inputted via said plurality of sensor inputs and predicting when a hazard is about to occur; said speaker providing a speech based communication comprising a warning and/or instruction when said hazard is predicted.

The speech-based communications can be provided via text-to-speech software, or by recorded communications or by combinations thereof. Also, in preferred embodiments, the communications can include data from one or more of said sensors, e.g., if a particular pressure reading is too high the actual PSI and sensor location or identity can be provided in the warning. For example, the warning might be "WARNING: BOTTOM PRESSURE IS TOO HIGH AT 1203 PSI. APPROACHING FRACTURE PRESSURE OF 1250 PSI."

In another embodiment, the processor is operably connected to an audio receiver and has speech-to-text software for verbally inputting instructions to said processor.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, buffers, and the like.

The term "speech" as used herein means that warning and/or instructions provided by the system are audible and in the format of the operator's language (e.g. verbally-based and spoken), in many cases in English, but not necessarily so. However, the speech-based system is not exclusive of other communication methods, and such warnings and/or instructions can also be provided to the operator or other parties by other means, including e.g., visual display, email, telephone, etc. Furthermore, critical events, such as kicks, may initiate an automated response such as shut in at the same time that speech based warning is given. In such an instance, the warning might be WARNING: KICK DETECTED. EMERGENCY SHUT IN INITIATED.

As used herein "hazard" refers to an initiating event that causes a verbal warning to be provided to the operator. However, no particular degree of danger is implied thereby, and it may simply be that the operator should change e.g. the drilling direction in accordance with a drilling plan.

The term "warning" refers to the verbal notification of a hazard, but again, no particular degree of danger is implied thereby.

The term "instruction" refers to the verbal provisions of one or more suitable responses to a hazard.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The invention is an automated method of monitoring and controlling operations within an oil and gas wellbore, said invention comprising either just the software, the software and hardware, or the software, hardware together with wellbore and sensors as the complete implemented system.

Thus, the invention as implemented includes a processor at or near a wellpad, said processor being operably connected to one or more speakers and/or headphones. A wellbore at said wellpad is equipped with a plurality of sensors, as is typical for monitoring drilling and recovery operations. The sensors are configured to provide sensor inputs to said processor, which then analyzes data from said sensor inputs and based on the software provided therein predicts when a hazard or undesirable condition is about to occur or has occurred. The speaker(s) then provide a speech-based communication when said hazard is predicted.

Text-to-speech algorithms are readily available and can be used to convert a text based warning and/or instruction to a speech-based output. Such software has come a long way since Walter Woltosz developed physicist's Stephen Hawking's first software program to allow him to communicate once his neural degeneration proceeded to the point where he could no longer talk. Indeed, text to speech software is included on most smart phones today, and is nearly ubiquitous in the developed world.

For example, some recent patents and/or application in the text to speech (TTS) area include US20130198327 U.S. Pat. No. 8,321,224, U.S. Pat. No. 8,595,011, U.S. Pat. No. 8,595,004, U.S. Pat. No. 8,583,437, U.S. Pat. No. 8,577,682, US2013304466, US201313943269, US2013262119, US2013262109, US2013244619, US2013218569, US2013218567, US2013218566, US2013198327, US2013179170, US2013166915, US2013166285, US2013144624, US2013110512, US2013096920, US2013085759, U.S. Pat. No. 8,560,005, U.S. Pat. No.

8,554,254, US2012109630, US2012109655, US2012010875, US2013066632, US2013054244, US2012173241, US2011320199, US2013013313, US2012016675, US2012041765, US2011320206, US2012265533, US2012136664, US2012089400, US2012065979, US2012053946, US2011165912, US2011313772, each incorporated by reference in their entireties.

A few of the many currently commercially available TTS technologies include:

Magnevation SpeakJet (speechchips.com) TTS256 Hobby and experimenter.

Epson S1V30120F01A100 (epson.com) IC DECTalk Based voice, Robotic, Eng/Spanish.

Textspeak TTS-EM (textspeak.com) ICs, Modules and Industrial enclosures in 24 languages. Human sounding, Phoneme based.

Figure 1:
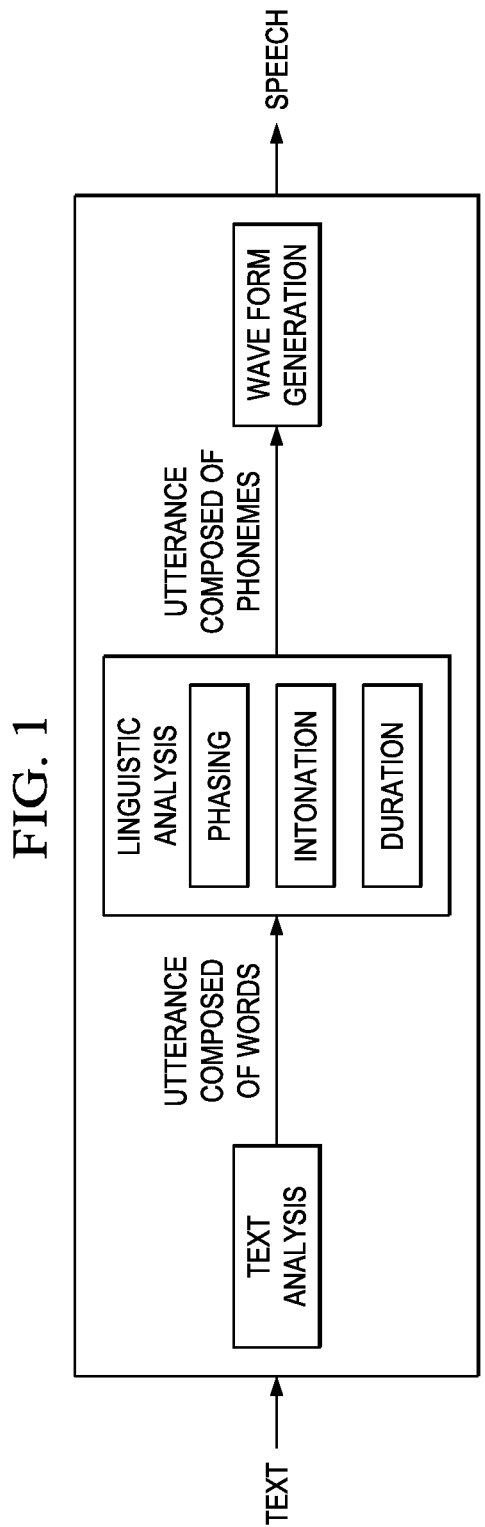
FIG. 1 is a schematic view of the text-to-speech process.

A text-to-speech system (or "engine") is composed of two parts: a front-end and a back-end. FIG. 1 shows a schematic of the basic text-to-speech process.

The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences.

The process of assigning phonetic transcriptions to words is called text-to-phoneme or grapheme-to-phoneme conversion. Phonetic transcriptions and prosody information together make up the symbolic linguistic representation that is output by the front-end.

The back-end—often referred to as the synthesizer—then converts the symbolic linguistic representation into sound. In certain systems, this part includes the computation of the target prosody (pitch contour, phoneme durations), which is then imposed on the output speech.

Alternatively, each of the hazard and instruction speeches can be read by an individual and that speech recorded for later use. While a less sophisticated than a TTS based approach, recoding messages may still be quite viable, especially where a limited number of warning and instructions are provided by the program. Nevertheless, TTS based speech generation is preferred because it is not so limited, and in addition to basic warnings and instruction it could also provide speech relating to real-time downhole conditions, e.g. pressure readings. Combination approaches are also possible, for example using recorded messages for basic warnings and instructions, and TTS based speech generation for reporting real-time data.

Figure 2:
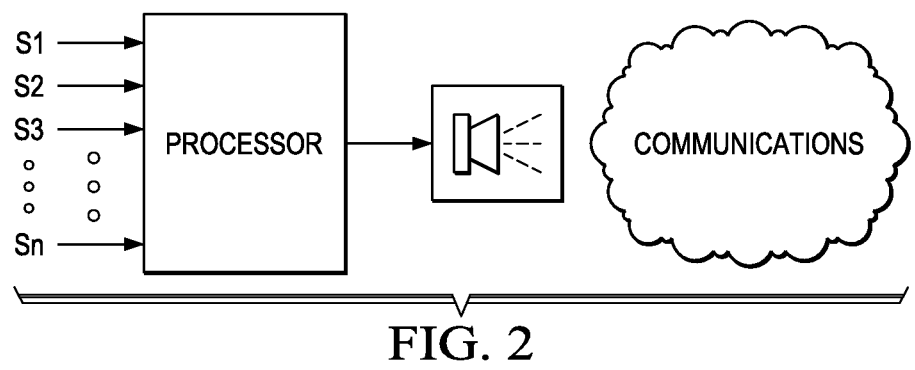
FIG. 2 shows a schematic of the invention in its simplest embodiment with speech output.

A simple schematic of this idea is shown in FIG. 2, which shows a variety of sensor inputs S1, S2, S3 . . . Sn being provided to the processor. Based on the analysis of the sensor inputs warnings and other speech-based communications are issued via the speaker.

In a further preferred embodiment, the system may also have speech-to-text capabilities being able thereby to provide simple responses to operator voice based questions or commands. Of course such a system may require a command confirmation or operator confirmation system to prevent inadvertent instructions from being acted upon. Thus, the operator may have a designated code, providing to the software that he is authorized to make operational changes, and an instruction confirmation window can also provide a text-based confirmation of the instruction. In some embodiments, the operator can be provided with e.g. an emergency code, allowing such precautions to be bypassed in the event of an emergency.

For example, if bottom hole pressure is too high, a kick can occur, which if not properly handled can lead to a blowout. Such a situation is critical enough to allow for emergency override instructions or even automated responses by the control system.

Figure 3:
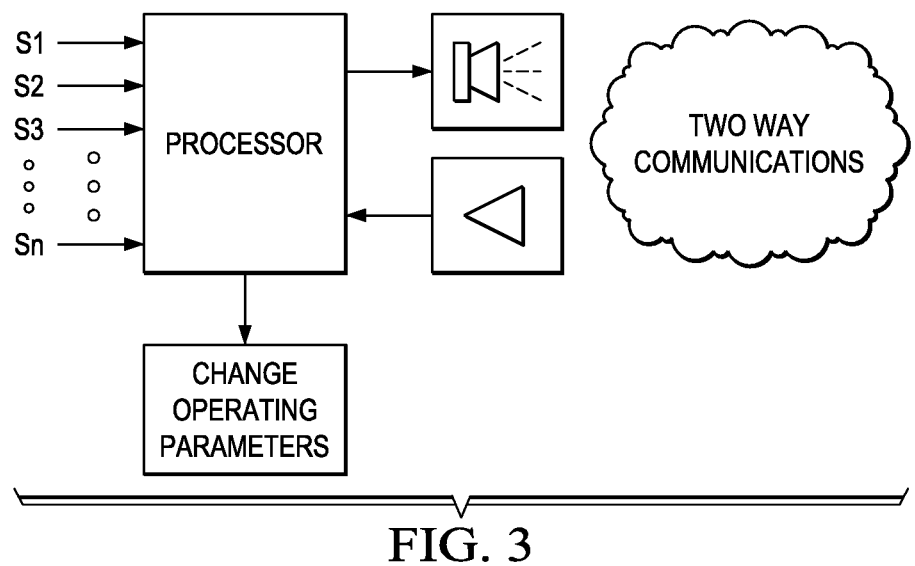
FIG. 3 shows a schematic of the invention in another embodiment having both speech output and input.

A schematic of this is shown in FIG. 3 which is similar to FIG. 2 except that an audio receiver or microphone is also shown (triangle), thus receiving a speech based instruction, which is converted to text that the software can recognize and a change in operative parameters thereby implemented.

The sensors used in the system can be any of those sensors currently in use downhole and includes any that may be implemented in the future. Such sensors of course include temperature and pressure sensors, positional sensors, torque sensors, weight sensors, hydrostatic pressure sensors, pressure gradient sensors, formation pressure sensors, overburden pressure sensors, fracture pressure sensors, pump pressure sensors (system pressure losses), slow pump pressure (SPP) sensors, shut-in drill pipe pressure sensors, shut-in casing pressure (SICP) sensors, bottom-hole pressure (BHP) sensors, Ultrasonic flow sensors, Coriolis flow sensors, ultrasonic sensors, distributed vibration sensors (DVS), IR sensors, magnetic sensors, gyroscopic sensors, downhole shock sensors, acoustic imaging sensors, resistivity sensors, density sensors, pressure while drilling (PWD) sensors, plunger sensors, and the like.

The warnings and suitable instructions can be contained in a database or integral portion of the software, and exemplary warnings and instructions can be as indicated in the following table:

| Sensor Input | Warning | Instruction |
| --- | --- | --- |
| Bottom Pressure High Drilling fluid pressure < fracture pressure | Warning: bottom pressure too high. | Increase drilling fluid flow rate |
| Drillbit Temperature | Warning, drillbit temperature too high | Slow drilling or increase flow of drilling mud |
| Drillbit torque | Warning: drillbit torque too high | Slow drilling or increase flow of drilling mud or decrease weight on bit or change drill bit |
| Drilling fluid pressure Fracture Pressure | Warning: drilling fluid pressure approaching fracture pressure | |

The speaker used herein can be any available speaker or speaker system because special speakers are not needed for text-to-speech conversions. Speaker placements can include e.g., a speaker at or near the processor, together with wireless speakers placed at suitable locations around the wellpad. Since the wellpad can be a noisy environment, especially during drilling operations, the operator may also wear earphone (wired or wireless) with speakers therein.

The audio receiver can be any suitable receiver, including e.g., a microphone connected to the operator's earphones. Such technology is already available for real-time remote transcription services and such systems could easily be adapted for use herein.

Figure 4:
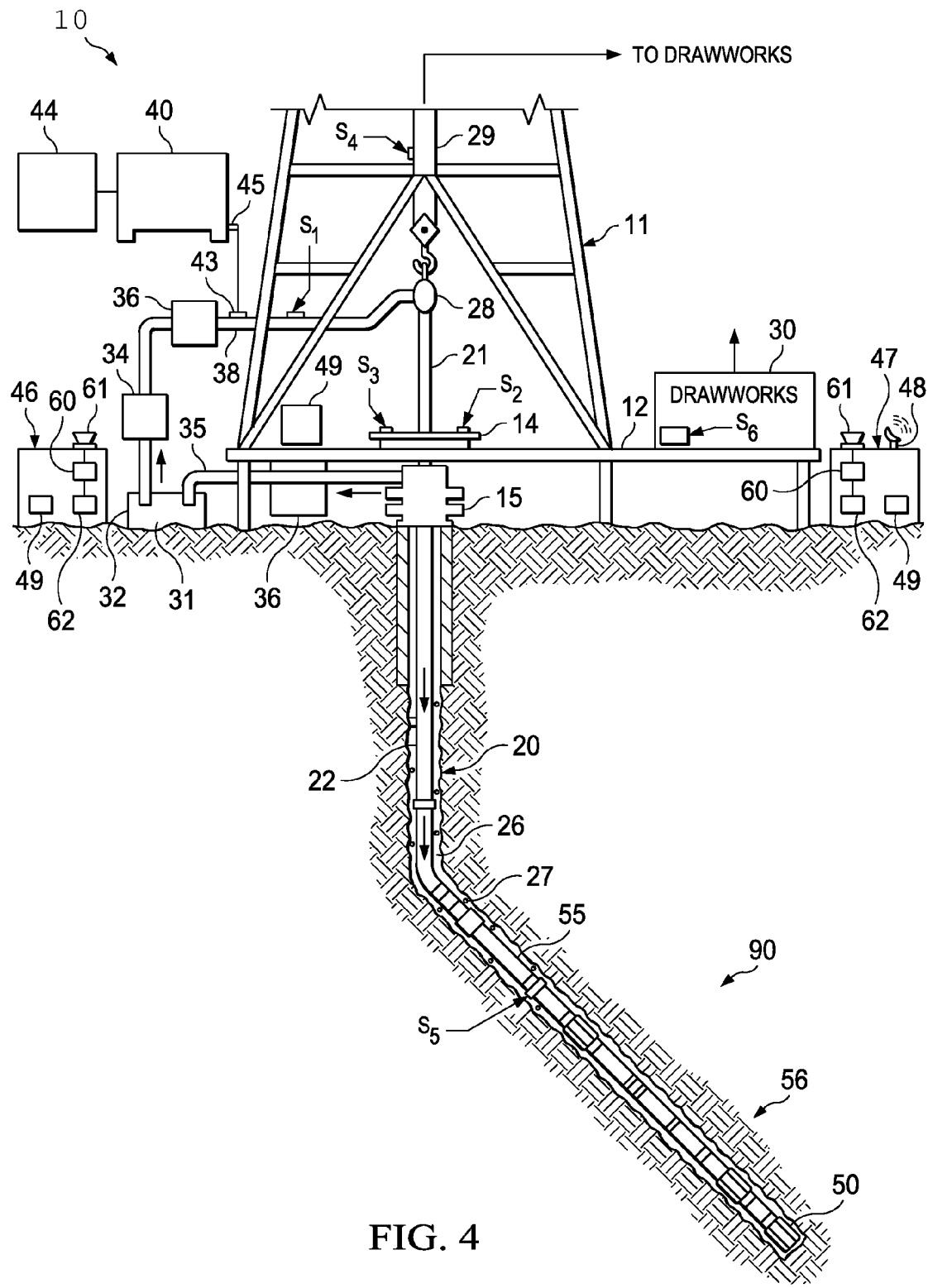
FIG. 4 is an exemplary system including wellbore, wellpad and associated equipment and downhole tools and sensors.

Referring now to FIG. 4, a schematic diagram of an embodiment of a drilling system 10 in accordance with the principles described herein is shown. Drilling system 10 includes a drilling assembly 90 for drilling a borehole 26. In addition, drilling system 10 includes a derrick 11 having a floor 12, which supports a rotary table 14 that is rotated by a prime mover such as an electric motor (not shown) at a desired rotational speed and controlled by a motor controller (not shown). The motor controller may be a silicon controlled rectifier (SCR) system, a Variable Frequency Device (VFD), or other type of suitable controller. In other embodiments, the rotary table (e.g., rotary table 14) may be augmented or replaced by a top drive suspended in the derrick (e.g., derrick 11) and connected to the drillstring (e.g., drillstring 20).

Drilling assembly 90 comprises a drillstring 20 including a drill pipe 22 extending downward from the rotary table 14 through a pressure control device 15 into the borehole 26. The pressure control device 15 is commonly hydraulically powered and may contain sensors for detecting certain operating parameters and controlling the actuation of the pressure control device 15. A drill bit 50, attached to the lower end of drillstring 20, disintegrates the earthen formations when it is rotated with weight-on-bit (WOB) to drill the borehole 26. Drillstring 20 is coupled to a draw works 30 via a kelly joint 21, swivel 28, and line 29 through a pulley.

During drilling operations, draw works 30 is operated to control the WOB, which impacts the rate-of-penetration of drill bit 50 through the formation. In this embodiment, drill bit 50 may be rotated from the surface by drillstring 20 via rotary table 14 and/or a top drive, rotated by downhole mud motor 55 disposed in drilling assembly 90, or combinations thereof (e.g., rotated by both rotary table 14 via drillstring 20 and mud motor 55, rotated by a top drive and the mud motor 55, etc.).

For example, rotation via downhole motor 55 may be employed to supplement the rotational power of rotary table 14, if required, and/or to effect changes in the drilling process. In either case, the rate-of-penetration (ROP) of the drill bit 50 into the borehole 26 for a given formation and a drilling assembly largely depends upon the weight-on-bit and the drill bit rotational speed.

During drilling operations a suitable drilling fluid 31 is pumped under pressure from a mud tank 32 through the drillstring 20 by a mud pump 34. Drilling fluid 31 passes from the mud pump 34 into the drillstring 20 via a desurger 36, fluid line 38, and the kelly joint 21. Drilling fluid 31 is discharged at the borehole bottom through nozzles in face of drill bit 50, circulates to the surface through an annular space 27 radially positioned between drillstring 20 and the sidewall of borehole 26, and then returns to mud tank 32 via a solids control system 36 and a return line 35.

Solids control system 36 may include any suitable solids control equipment known in the art including, without limitation, shale shakers, centrifuges, and automated chemical additive systems. Control system 36 may include sensors and automated controls for monitoring and controlling, respectively, various operating parameters such as centrifuge rpm. It should be appreciated that much of the surface equipment for handling the drilling fluid is application specific and may vary on a case-by-case basis.

Various sensors are employed in drilling system 10 for monitoring a variety of surface-controlled drilling parameters and downhole conditions. For example, sensors S1 on line 38 measures and provides information about the drilling fluid flow rate and pressure. In addition, a surface torque sensor S2 measures and provides information about the torque applied to drillstring 20 at the surface, and a downhole torque sensor S5 measures and provides information about the torque applied to drill bit 50. A rotational speed and acceleration sensor S3 measures and provides information about the rotational speed and acceleration of drillstring 20 and bit 50. Further, a sensor S4 measures and provides information relating to the hook load of drillstring 20 and WOB applied to bit 50. The axial speed and acceleration of drillstring 20 and bit 50 are measured and provided by a position encoder or sensor S6 associated with the rotating drum of draw works 30. Axial acceleration of the drillstring and the drill bit may also be measured with an accelerometer coupled to the drillstring or one of the tools in the drillstring, such as a MWD or LWD tool, and axial speed may be computed based on the axial acceleration measurements. Additional sensors are associated with the motor drive system to monitor drive system operation. These include, but are not limited to, sensors for detecting motor speed (RPM), winding voltage, winding resistance, motor current and motor temperature. Still further, other sensors are used to measure and provide information relating to the solids control equipment, and the pressure control equipment (e.g., to indicate hydraulic system status and operating pressures of the blowout preventer, and choke associated with pressure control device 15).

Signals from the various sensors (e.g., sensors S1, S2, S3, S4, S5, S6, . . . Sn) are input to a control system processor 60 located in the tool pusher's cabin 47 or the operator's cabin 46. In general, the processor 60 may be any suitable device or system for performing programmed instructions including, without limitation, general-purpose processors, digital signal processors, and microcontrollers configured to perform instructions provided by software programming. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems and devices (e.g., serial ports, parallel ports, etc.), and various other components and sub-systems. Software programming can be stored in a computer readable medium. Exemplary computer readable media include semiconductor memory, optical storage, and magnetic storage.

Processor 60 is operably coupled to speaker 61, which provides the speech-based warning and instructions as described herein. Optional audio receiver 62 is also operably coupled to processor and can received speech-based instructions.

Referring still to FIG. 1, processor 60 is also operably coupled with draw works 30 and other mechanical, hydraulic, pneumatic, electronic, and wireless subsystems of drilling system 10 to control various drilling parameters. In particular, based on input of the various sensors, processor 60 can adjust drilling parameters including, without limitation, the weight-on-bit applied to bit 50; the torque applied to drillstring 20 and drill bit 50 (via rotary table 14, a top drive, mud motor 55, or combinations thereof); the rotational speed and acceleration of drillstring 20 and drill bit 50; the axial position, speed, and acceleration of drillstring 20 and drill bit 50; and the pressure and flow rate of drilling fluid 31 flowing down drillstring 20 to drill bit 50.

In addition, processor 60 permits input of a predetermined maximum and minimum value for each drilling parameter including, without limitation, a predetermined maximum and minimum torque, rotational speed, acceleration, axial speed applied to the drillstring and drill bit and a predetermined maximum and minimum flow rate and pressure for the drilling fluid, and the like. The desired predetermined maximum and minimum drilling parameters may be inputted at the rig, e.g., via keyboard, or from a remote location.

As an alternative to user input predetermined minimum and maximum values for each drilling parameter, processor 60 may dynamically calculate or determine minimum and maximum values for each drilling parameter based on measurements as drilling progresses.

Processor 60 also receives and interprets signals from the various rig sensors, downhole sensors, and other input data from service contractors, and is capable of outputting the received and interpreted data to the operator via speaker 61. Based on a comparison of the measured data with the well plan models, and a comparison of the measured data with the minimum and maximum values for each drilling parameter, processor 60 determines if any adjustments are necessary to maintain the current well plan, and provides warning and/or instructional information via speaker 61. Multiple speakers may be available to ensure that the speaker based warning is heard at all essential locations. However, in addition other suitable means may be employed to communicate the desired, predetermined maximum and minimum for each drilling parameter including, without limitation, email, phone texts, display warnings, and the like.

Based on a comparison of the measured data with the well plan models and the minimum and maximum values for the drilling parameters, processor 60 may (a) suggest the appropriate corrective action and request authorization to implement such corrective action, or (b) automatically implement the appropriate corrective action, thereby minimizing potential delays in relying on the manual adjustment of surface-controlled drilling parameters. The measured data and status information may also be communicated using hardwired or wireless techniques 48 to remote locations off the well site. Processor 60 is optionally configured and adapted to execute instructions received via audio receiver 62 that allow processor 60 to implement various modifications being made.

In one embodiment, drilling assembly 90 also includes an MWD and/or LWD assembly 56 that contain sensors for determining drilling dynamics, directional, formation parameters, and downhole conditions. The sensed values are transmitted to the surface via mud pulse telemetry and received by a sensor 43 mounted in line 38. The pressure pulses are detected by circuitry in receiver 40 and the data processed by a receiver processor 44. Although mud pulse telemetry is employed in this example, in general, any suitable telemetry scheme may be employed to communicate data from downhole sensors to the surface including, without limitation, electromagnetic telemetry, acoustic telemetry, or hardwire connections (e.g., wired drill pipe).

Although FIG. 4 is generally drawn as a land rig, the disclosure is also equally applicable to offshore drilling systems and methods, and also to completion and post-completion activity, such as steam injection, shut-in, workover, scale inhibitor squeezes, fracking, production, and the like. Further, various components of the drilling system 10 can be automated to various degrees, as for example, use of a top drive instead of a kelly.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

All references cited herein are expressly incorporated by reference in their entireties for all purposes. The discussion of any reference is not an admission that it is prior art to the present invention, especially any reference that may have a publication date after the priority date of this application. Incorporated references are listed again here for convenience:

Oilwell control software: US20120217067, U.S. Pat. No. 8,332,153, U.S. Pat. No. 7,729,895, U.S. Pat. No. 6,820,702, US20120123756, US20120139747, US20100193245.

Text to speech systems: US20130198327 U.S. Pat. No. 8,321,224, U.S. Pat. No. 8,595,011, U.S. Pat. No. 8,595,004, U.S. Pat. No. 8,583,437, U.S. Pat. No. 8,577,682, US2013304466, US201313943269, US2013262119, US2013262109, US2013244619, US2013218569, US2013218567, US2013218566, US2013198327, US2013179170, US2013166915, US2013166285, US2013144624, US2013110512, US2013096920, US2013085759, U.S. Pat. No. 8,560,005, U.S. Pat. No. 8,554,254, US2012109630, US2012109655, US2012010875, US2013066632, US2013054244, US2012173241, US2011320199, US2013013313, US2012016675, US2012041765, US2011320206, US2012265533, US2012136664, US2012089400, US2012065979, US2012053946, US2011165912, US2011313772.

The invention claimed is:

1. An automated system for controlling operations within an oil and gas wellbore, said system comprising:
    a. a processor at or near a wellpad, said processor operably connected to a speaker;
    b. a wellbore at said wellpad, said wellbore equipped with a plurality of sensors;
    c. said sensors operably connected to said processor;
    d. said processor analyzing data from said sensors and predicting when a hazard is about to occur;
    e. said speaker providing a speech based warning when said hazard is predicted.

2. The system of claim 1, wherein said processor also predicts one or more suitable responses to said hazard and said speaker providing one or more speech based instructions when said one or more responses are predicted.

3. The system of claim 1, wherein the speech based warning is provided via text-to-speech software.

4. The system of claim 1, wherein the speech based warning is provided via a recorded warning.

5. The system of claim 1, wherein said warning includes data from one or more of said sensors.

6. The system of claim 3, wherein the speech based instruction is provided via a recorded warning.

7. The system of claim 4, wherein the speech based instruction is provided via a recorded instruction.

8. The system of claim 1, wherein said warning includes data from one or more of said sensors.

9. The system of claim 2, wherein the speech based warning and said speech based instruction are provided via a combination of recorded messages and text-to-speech software.

10. The system of claim 1, where said processor is operably connected to an audio receiver and has speech-to-text software for verbally inputting instructions to said processor.

11. The system of claim 1, wherein said sensors include sensors for temperature, pressure, drillbit speed, and drillbit rotary torque.

12. An oilwell control system, comprising a processor operably connected to a speaker and operably connected to a plurality of oilwell sensor inputs, said processor analyzing data inputted via said plurality of oilwell sensor inputs and predicting when a hazard is about to occur; said speaker providing a speech based communications comprising warning and/or instructions when said hazard is predicted.

13. The control system of claim 12, wherein the speech based communication is provided via text-to-speech software or recorded warning or combinations thereof.

14. The control system of claim 12, wherein said communication includes data from one or more of said sensor inputs.

15. The control system of claim 12, where said processor is operably connected to an audio receiver and has speech-to-text software for verbally inputting instructions to said processor.

16. The control system of claim 12, wherein said sensors include sensors for temperature, pressure, drillbit speed, and drillbit rotary torque.

\* \* \* \* \*